(12) United States Patent
Storaasli et al.

(10) Patent No.: US 7,391,944 B2
(45) Date of Patent: Jun. 24, 2008

(54) FIBER OPTIC CABLE WITH A CONCAVE SURFACE

(75) Inventors: Olaf Loy Storaasli, Hickory, NC (US); Jeffrey Scott Barker, Statesville, NC (US)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/456,945

(22) Filed: Jul. 12, 2006

(65) Prior Publication Data

US 2007/0047884 A1    Mar. 1, 2007

Related U.S. Application Data

(60) Provisional application No. 60/710,873, filed on Aug. 25, 2005.

(51) Int. Cl.
*G02B 6/44* (2006.01)

(52) U.S. Cl. .................. 385/100; 385/102; 385/103; 385/113

(58) Field of Classification Search ............... None
See application file for complete search history.

(56) References Cited

U.S. PATENT DOCUMENTS

| | | | |
|---|---|---|---|
| 6,449,412 B1 * | 9/2002 | Rutterman et al. | 385/103 |
| 6,493,491 B1 * | 12/2002 | Shen et al. | 385/113 |
| 6,501,888 B2 | 12/2002 | Gimblet et al. | |
| 6,542,674 B1 | 4/2003 | Gimblet | |
| 6,567,592 B1 * | 5/2003 | Gimblet et al. | 385/113 |
| 6,714,710 B2 | 3/2004 | Gimblet | |
| 6,836,603 B1 * | 12/2004 | Bocanegra et al. | 385/113 |
| 7,079,734 B2 * | 7/2006 | Seddon et al. | 385/102 |
| 2006/0165355 A1 * | 7/2006 | Greenwood et al. | 385/100 |

* cited by examiner

*Primary Examiner*—Tim M Wong
(74) *Attorney, Agent, or Firm*—Sughrue Mion, PLLC

(57) ABSTRACT

A drop cable includes a jacket having first and second opposing sides. The first side has a concave surface. At least one strength member is disposed in the jacket. An optical transmission component is disposed within the jacket and proximate the concave surface. The optical transmission component includes a plurality of optical fibers.

11 Claims, 4 Drawing Sheets

FIBER OPTIC CABLE WITH A CONCAVE SURFACE

CROSS-REFERENCE TO RELATED APPLICATIONS

This Application claims the benefit of U.S. Provisional Application No. 60/710,873, filed in the United States Patent and Trademark Office on Aug. 25, 2005. That application is hereby incorporated herein by reference in its entirety.

FIELD OF THE INVENTION

The present invention relates generally to optical drop cables containing optical fiber ribbons or bundles of optical fibers, and, more particularly, optical drop cables having a jacket with a generally flat shape and a concave surface for crush resistance and easy fiber access.

BACKGROUND OF THE INVENTION

Drop cables for optical fibers are typically used for short lengths to provide the last or second to last connection from the distribution cable to the end user. Because of the large number of cables and cable access requirements of drop cables within optical network architecture, a key requirement of drop cables is craft friendliness. This includes easy access to the optical fibers for connection, through removal of protective jacketing and tubes. Also, the use of ribbonizing technology allows for mass fusion splicing of the optical fibers in the drop cable. Rather than splicing one fiber at a time, multiple fibers can be spliced at one time.

One prior art type of drop cable used for bundles and ribbons of optical fiber is round, as shown in FIG. 1. The drop cable 101 has a round jacket 110. In the center of the jacket 110 is the optical transmission component, which includes an optical ribbon 102 contained inside of a buffer tube 130. The optical transmission component is further protected by a protective sheath 120, which may be metal or another strong, ductile material. For further rigidity, strength members 141 are provided on opposing sides of the optical transmission component. Because of the round design, the load path during transverse loading passes through the buffer tube 130. Further, access to the optical fibers inside of the drop cable can be difficult with the design shown in FIG. 1 because of the protective sheath 120.

Prior art drop cables often contain metallic elements, such as the protective sheath, that must be grounded at each end during the installation process to prevent the buildup of an electrical charge within the drop cable. This grounding is often labor intensive and requires additional parts. Many times the metallic element is a toning wire, which is in the drop cable only for locating purposes. In order to locate an underground drop cable, the a tone is applied through the toning wire. The tone is sensed by detection equipment and the exact location of the underground drop cable can be determined.

Also, access to the optical ribbons is known to be difficult with the prior solutions. Many designs do not incorporate ripcords and require a labor intensive shaving or stripping procedure to remove the jacket along the radial strength members in order to access the optical ribbons. Thick jackets surrounding the optical ribbons can make access to the optical ribbons more difficult as well.

SUMMARY OF THE INVENTION

In one aspect, the present invention relates to an optical fiber drop cable. The drop cable includes a jacket having first and second opposing sides. At least the first side has a concave surface. At least one strength member is disposed in the jacket. An optical transmission component that includes a plurality of optical fibers is disposed within the jacket and proximate the concave surface.

Other aspects and advantages of the invention will be apparent from the following description and the appended claims.

DETAILED DESCRIPTION OF THE INVENTION

Embodiments of the invention relate generally to drop cables having a jacket that contains an optical transmission component with a plurality of optical fibers contained therein. The optical fibers may be loosely bundled or joined in some manner, such as in an optical ribbon. The jacket has two wide opposing sides that are wider than two other opposing sides. At least one of the two wide opposing sides includes a concave surface. As used herein, "concave" refers broadly to a surface curving inward.

Figure 1:
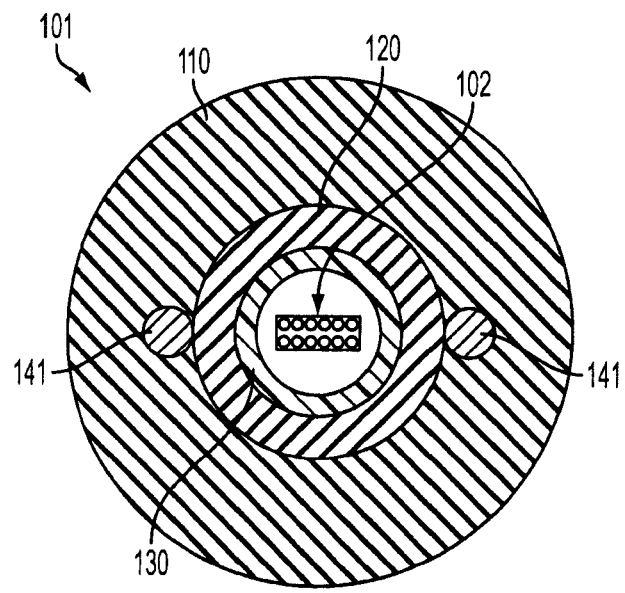
FIG. 1 shows a prior art drop cable.

In FIG. 1, a cross-section of a drop cable 201 in accordance with an embodiment of the present invention is shown. The drop cable 201 has a jacket 220 with two wide opposing sides (top and bottom) that are wider than two other opposing sides (left and right). In this embodiment, two strength members 241 are respectively disposed on opposing sides of the optical transmission component in a direction parallel to the wide opposing sides. However, it is understood that the invention covers embodiments including just one strength member or more than two strength members. The optical transmission component comprises a buffer tube 260 and a plurality of optical fibers. In this embodiment, the optical fibers are joined in an optical ribbon 270. Those having ordinary skill in the art will appreciate that the manner in which the optical fibers are arranged may vary without departing from the scope of the present invention. The buffer tube 260 is conventional and may be formed of polypropylene, polyethylene, and blends thereof. The buffer tube 260 may be gel-filled or have dry water-blocking elements, such as water swellable tape or water swellable yarns. The buffer tube 260 may be surrounded with a plurality of strength yarns 250. In one embodiment, the strength yarns 250 may be made of a water blocking material.

Figure 2:
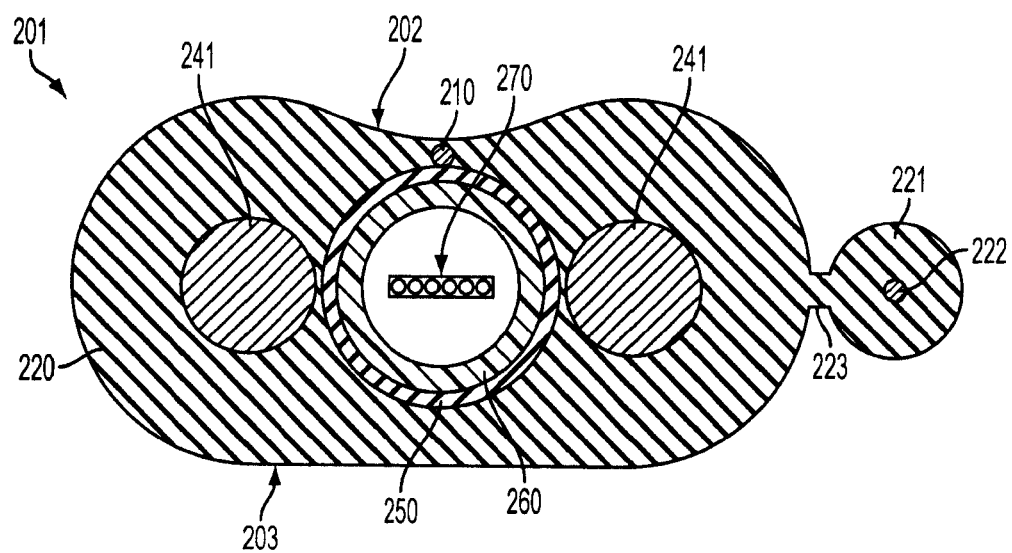
FIG. 2 shows cross-section of a drop cable in accordance with an embodiment of the present invention.

In order to make the drop cable more flexible transverse to the two wide opposing sides as compared to parallel to the wide opposing sides, the optical transmission component and the two strength members 241 may be aligned in a direction parallel to the wide opposing sides, as shown in FIG. 2. The strength members 241 may be metallic or made of a dielectric material, such as glass-reinforced plastic. The strength members 241 may be in the form of a rod or braided/helically wound wire or fibers. If a dielectric material is used to form the strength members 241, grounding the strength members 241 during installation will not be necessary.

According to one embodiment of the invention, the jacket 220 includes a concave surface 202 on one of the two wide opposing sides and a flat surface 203 on the opposite side. The optical transmission component is preferably aligned in a direction transverse the wide opposing sides with the deepest portion of the concave surface 202, as shown in FIG. 2. The thinned section of the jacket 220 between the optical transmission component and the concave surface 202 provides two important advantages.

In one embodiment, the concave surface 202 allows for easy access to the optical transmission component through the jacket 220 because there is less jacket material present around at least a portion of the optical transmission component. More specifically, the thinned section of the jacket 220 is more easily cut to access the optical transmission component and remove it without the extra step of stripping out the strength members 241. A ripcord 210 may be provided in the thinned section near the deepest part of the concave surface 210. Pulling on the end of an exposed portion of the ripcord 210 will split open the jacket 220 over a certain length of the drop cable and allow removal of the optical transmission component or optical fibers from the jacket 220. This feature allows for an installer to easily access the optical fibers in order to splice them in an installed arrangement. When compared to a similarly sized drop cable lacking a concave surface in the jacket, the thinned portion of the jacket 220 also allows a smaller and cheaper ripcord 210 to be used because the tensile strength required to rip the jacket 220 open is reduced because there is less jacket material to rip through.

Figure 3A:
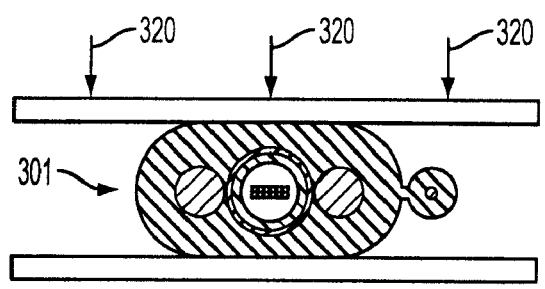
FIGS. 3(a) and 3(b) show force diagrams of a drop cable having flat sides.
Figure 3B:
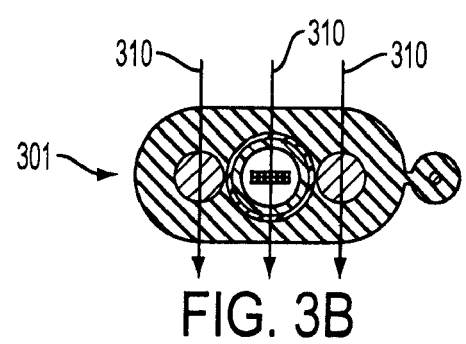
Figure 4A:
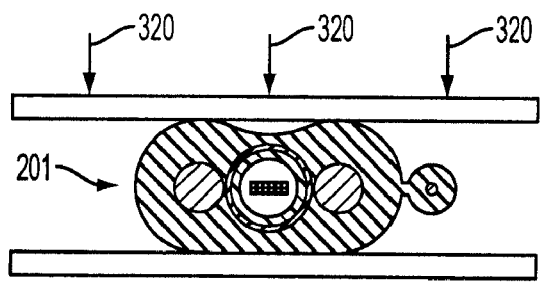
FIGS. 4(a) and 4(b) show force diagrams of a drop cable in accordance with an embodiment of the present invention.
Figure 4B:
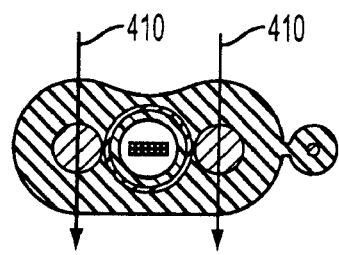

A second advantage is that the optical transmission component and the optical fibers contained therein are protected from a force exerted on the wide opposing sides of the cable. FIGS. 3A, 3B, 4A and 4B are provided to illustrate this advantage. FIGS. 3A and 3B show a drop cable 301 that includes a jacket in which the two opposing sides that are both flat. In contrast, FIGS. 4A and 4B show the drop cable 201 having a concave surface on one of the two wide opposing sides, with the opposite side being flat, in accordance with an embodiment of the present invention, as illustrated in FIG. 2. FIGS. 3A and 4A illustrate pressing forces 320 transverse to the two wide opposing sides of drop cables 301 and 201. Such forces may be experienced when the drop cables 301 and 201 are clamped in an installation. FIGS. 3B and 4B illustrate how the pressing forces 320 are transmitted through the drop cables 301 and 201. Because of the two flat wide opposing sides of drop cable 301 of FIG. 3A, the transmitted forces 310 are distributed evenly through the components contained in the jacket, including the optical transmission component, which might damage the optical fibers contained within the optical transmission component. In contrast, because of the concave surface on one of the two wide opposing sides of drop cable 201 of FIG. 4A, in accordance with an embodiment of the present invention, the transmitted forces 410 are distributed primarily through the thicker portions of the drop cable 201 on either side of the concave surface. Thus, instead of exposing the optical transmission component to forces that can cause damage, the pressing forces are borne by the strength members contained within the jacket. Damage to the optical transmission component from handling and clamping may be avoided as a result of the at least one concave surface.

Returning to FIG. 2, an optional feature of this particular embodiment is a sheath 221 attached to the jacket 220 by a thin web 223. A toning wire 222 may be disposed within the sheath 221. As discussed above, the toning wire 222 allows for the location of a hidden drop cable 201 to be determined by transmitting a tone from either end of the drop cable 201 through the toning wire 222. Suitable materials for a toning wire 222 include conductive metals, such as copper and aluminum. The thin web 223 allows for easy tool-less separation of the toning wire 222 from the remainder of the drop cable 201.

For embodiments having one of the two wide opposing sides that is flat, an advantage is that the wide, flat side can be used for large legible printing of cable information such as manufacturer, manufacture date, production identification, fiber count, and any other information that would be useful. The flat shape is also advantageous as the cable can be used in an aerial self-support configuration using standard industry hardware clamps. Wedge clamps common for both copper and fiber optical drop cables are widely available.

Figure 5:
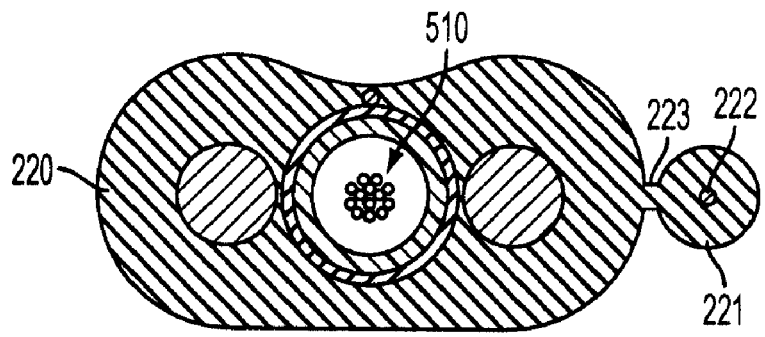
FIGS. 5, 6, 7, and 8 show drop cables in accordance with embodiments of the present invention.
Figure 6:
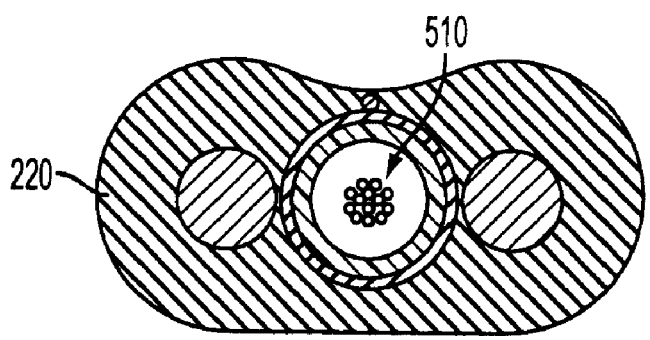
Figure 7:
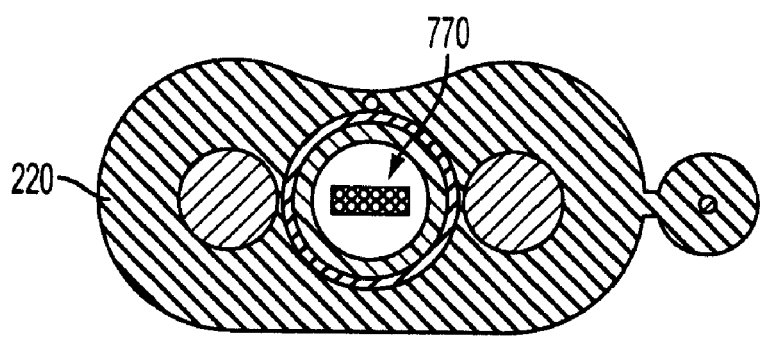

FIGS. 5, 6, and 7 show drop cables in accordance with additional embodiments of the present invention. In FIG. 5, the drop cable includes an optical transmission component that includes a plurality of optical fibers in a bundle 510. The embodiment shown in FIG. 6 is similar to the FIG. 5 embodiment, but does not include a separate toning wire disposed in a sheath. Of course it is understood that the transmission element in the embodiment of FIG. 6 could alternatively include one or more optical fiber ribbons, instead of the loose fiber design shown in FIG. 6 In FIG. 7 embodiment, the transmission element includes a pair of optical fiber ribbons 770, with two rows of six optical fibers.

Figure 8:
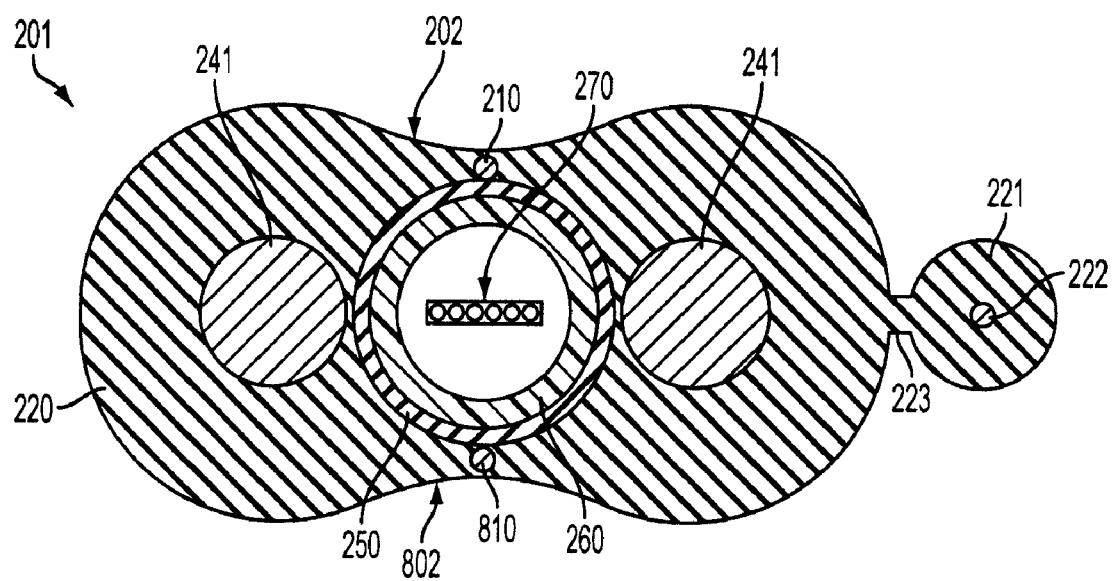

FIG. 8 shows a drop cable in accordance with another embodiment of the present invention. In this embodiment, the jacket 220 may have a first concave surface 202 and a second concave surface 802 in the two wide opposing sides. A second ripcord 810 may be provided between the second concave surface 802 and the optical transmission component. By using the two ripcords 210 and 810, the jacket 220 may be torn in half to access the optical transmission component contained therein. A further advantage of the embodiment shown in FIG. 8 may be improved crush resistance against transverse loading, such as the loading illustrated in FIGS. 4A and 4B of an embodiment with one concave surface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical fiber drop cable, comprising:
   a jacket having first and second opposing sides, said first side having a concave surface and said second opposite side being substantially planar, said first side of said jacket having a thinned portion defined by the concave surface;
   a buffer tube disposed within the jacket and proximate the concave surface, the buffer tube having a plurality of optical fibers therein; and
   first and second strength members disposed in the jacket at respective opposite sides of the buffer tube,
   wherein said thinned portion is aligned with said buffer tube and
   wherein an outside diameter of the buffer tube is greater than an outside diameter of the respective strength members.

2. The optical fiber drop cable of claim 1, further comprising:

a ripcord disposed in the thinned portion of the jacket between the concave surface and the optical buffer tube.

3. The optical fiber drop cable of claim 1, further comprising:

a toning wire connected to the jacket.

4. The optical fiber drop cable of claim 2, wherein the toning wire is disposed in a sheath connected to the jacket by a thin web.

5. The optical fiber drop cable of claim 1, wherein the plurality of optical fibers are arranged in a ribbon.

6. An optical fiber drop cable, comprising:

a jacket having two wide opposing sides wider than two other opposing sides, wherein one of the two wide opposing sides comprises a concave surface and the other side being substantially planar;

two strength members disposed in the jacket;

an optical transmission component comprising a plurality of optical fibers disposed within a buffer tube, wherein the optical transmission component is disposed between the two strength members and proximate the concave surface; and a ripcord disposed in the jacket between the concave surface and the optical transmission component, wherein the two strength members are disposed in thicker portions of the jacket than the optical transmission component and wherein a diameter of the buffer tube containing the optical fibers is larger than respective diameters of the strength members.

7. The optical fiber drop cable of claim 6, further comprising:

a toning wire.

8. The optical fiber drop cable of claim 7, wherein the toning wire is disposed in a sheath connected to the jacket by a thin web.

9. The optical fiber drop cable of claim 6, further comprising:

a plurality of strength yarns surrounding the optical transmission component.

10. The optical fiber drop cable of claim 9, wherein the plurality of strength yarns block water.

11. The optical fiber drop cable of claim 6, wherein the plurality of optical fibers are arranged in a ribbon.

* * * * *